US012068462B2

(12) United States Patent
Treger et al.

(10) Patent No.: US 12,068,462 B2
(45) Date of Patent: Aug. 20, 2024

(54) VOLTAGE STABILIZATION OF LOW VOLTAGE METAL-METAL CELLS

(71) Applicant: CAMX Power LLC, Lexington, MA (US)

(72) Inventors: Jack Treger, Quincy, MA (US); Kacy Tully, Lexington, MA (US)

(73) Assignee: CAMX Power LLC, Lexington, MA (US)

( * ) Notice: Subject to any disclaimer, the term of this patent is extended or adjusted under 35 U.S.C. 154(b) by 11 days.

(21) Appl. No.: 17/314,375

(22) Filed: May 7, 2021

(65) Prior Publication Data

US 2021/0351443 A1 Nov. 11, 2021

Related U.S. Application Data

(60) Provisional application No. 63/021,204, filed on May 7, 2020.

(51) Int. Cl.
*H01M 10/42* (2006.01)
*H01M 4/134* (2010.01)
*H01M 4/02* (2006.01)

(52) U.S. Cl.
CPC ....... *H01M 10/4257* (2013.01); *H01M 4/134* (2013.01); *H01M 2004/027* (2013.01); *H01M 2004/028* (2013.01); *H01M 2010/4271* (2013.01)

(58) Field of Classification Search
CPC ............. H01M 10/4257; H01M 4/134; H01M 2010/4271
See application file for complete search history.

(56) References Cited

U.S. PATENT DOCUMENTS

2013/0302699 A1* 11/2013 He .................. H01M 4/13 29/623.5
2015/0171396 A1* 6/2015 Okuno ............. H01M 50/431 701/22
2018/0090726 A1* 3/2018 Thompson .......... H01M 50/191
2021/0175509 A1* 6/2021 Lai .................. H01M 10/0525

* cited by examiner

*Primary Examiner* — James Lee
(74) *Attorney, Agent, or Firm* — Weston R. Gould; Dinsmore & Shohl LLP

(57) ABSTRACT

A low voltage electrochemical cell is provided that includes a metallic anode including an anode metal, a metallic cathode including a cathode metal, the metallic cathode further including a surface layer including an alloy of the anode metal and the cathode metal, an electrolyte disposed between the metallic anode and the metallic cathode, and a separator within the electrolyte or embedded with electrolyte. The electrochemical cell further includes a voltage stabilization electron current between said anode and said cathode, where the voltage stabilization electron current has an amperage capable of maintaining an open load circuit voltage of the electrochemical cell that varies by less than 10 percent over 10 hours or greater, optionally a month or greater, optionally over the cell lifetime, or a non-equilibrium anode metal/cathode metal ratio in the surface layer for 10 hours or greater, optionally a month or greater, optionally over the cell lifetime.

21 Claims, 9 Drawing Sheets

VOLTAGE STABILIZATION OF LOW VOLTAGE METAL-METAL CELLS

CROSS REFERENCE TO RELATED APPLICATIONS

This application depends from and claims priority to U.S. Provisional Application No. 63/021,204, filed May 7, 2020, the entire contents of which are incorporated herein by reference.

STATEMENT OF GOVERNMENT SPONSORSHIP

This invention was made with government support under grant no. D17PC00135, awarded by the Defense Advanced Research Projects Agency. The government has certain rights in the invention.

FIELD

This disclosure relates to voltage stabilized low-voltage electrochemical cells and methods of maintaining constant voltage over the cell lifetime independent of load.

BACKGROUND

Ultra-low power electronic circuits, consuming as little as 10 nW and assembled from devices operating below conventional threshold voltages, for example, transistors gated at voltage below normal "on" voltage, can enable very long life for unattended sensors and sensor radio networks, and for consumer, business and commercial products that wirelessly connect to the internet (the "internet of things"), because they require very little energy. Such subthreshold circuits typically operate at voltages well below 1.0 V; therefore, when typical batteries are used to power them, the voltage must be electronically stepped down in an inefficient process that negates the ultra-low power consumption of the circuits themselves. Electrochemical couples for these low voltage batteries will typically be required to have voltage less than 1.0 V while providing high capacity (e.g., 100 mAh) for very long-lived discharge at currents up to 1 μA in small cells of 0.5 cc or lower volume.

Furthermore, it is highly desirable that such low-voltage batteries maintain near-constant voltage (e.g., ±5%) under their full range of operating conditions, in contrast to many commercial batteries having an equilibrium discharge voltage that decreases as the capacity of the cell is consumed. A number of electrochemical cells with flat, stable discharge profiles are known, such as those listed in Table 1. However, all except the Cd/HgO electrochemical cell have a voltage that is greater than 1.0 V, which may be unsuitably high for use in these low voltage devices. These high voltages can be lowered to a useful range using electronic circuitry such as linear voltage controllers or switched power circuits, but there will be a penalty such as low conversion efficiency, added bulk, or added cost. Cd/HgO has a suitable voltage, that is, under 1.0 V, however the capacity is relatively low and the materials used are toxic.

TABLE 1

| Prior Electrochemical Systems | | | |
|---|---|---|---|
| Electrochemical Couple | Voltage Volts | Capacity Wh/L | Comments relative to use in low voltage devices (e.g. ≤1.0 V) |
| Li/SO$_2$ | 2.9 | 415 | Voltage too high |
| Li/I$_2$ | 2.8 | 900 | Voltage too high |
| Li/CF$_x$ | 2.6 | 650 | Voltage too high |
| Zn/Ag$_2$O | 1.55 | 500 | Voltage too high |
| Li/CuO | 1.5 | 570 | Voltage too high |
| Zn/HgO | 1.3 | 470 | Voltage too high, toxic |
| Ni/MH | 1.25 | 250 | Voltage too high, low capacity |
| Zn/Air | 1.2 | 1000 | Voltage too high, short activated life |
| Cd/HgO | 0.9 | 230 | Toxic, low capacity |

A relatively non-toxic primary or secondary electrochemical cell with a cell voltage under 1.0 V and a volumetric capacity at or greater than 200 Ah/L or at or greater than 500 Ah/L can be made by using a metallic anode and a metallic cathode. An electron blocking and ion conductive separator is present between the anode and cathode. Electron current flows from the anode to the outside load and back into the cathode. An ion conducting electrolyte transports ions from the dissolving anode to the cathode where they are reduced to an alloy with the cathode and returning electrons. The metallic anode can be an element or alloy chosen from Group 1, 2, 12 or 13 of the modern IUPAC periodic group number classification. The metallic cathode can be an element or alloy chosen from Group 2-14 sequentially of the modern IUPAC periodic group number classification. Additionally, the anode is more electronegative relative to the cathode and can electrochemically alloy with the cathode by the general reaction.

$$nA + mC \longrightarrow A_nC_m$$

where A is a Group 1, 2, 12 or 13 metal or alloy and C is a Group 2-14 metal or alloy and n and m are integers reflecting the composition of the alloy produced by the alloying reaction.

To produce a thermodynamic driving force for the reaction, and a subsequent cell voltage, there must be a difference in the standard potential of the anode and cathode. The anode also must be more electronegative than the cathode, i.e. the electron flow is from the anode to the cathode and the ion flow (cations of the anode metal) is also from the anode to the cathode.

While the metallic anode/metallic cathode cells may address the low voltage requirements, and assist with volumetric capacity, a key disadvantage of currently known cells is voltage drift during open circuit voltage or low current drain conditions. In some instances, the voltage drift can be greater than 10%, which is undesirable in some applications. For example, in a cell with a lithium anode and an aluminum cathode operating at 0.33 V, the voltage can drift upwards to over 0.4 V during open circuit or low current drain conditions. This can occur when the cathode voltage is determined by a non-equilibrium condition that subsequently undergoes phase transformation towards a condition closer to thermodynamic equilibrium at open circuit or low current drain conditions.

As such, prior cells that provide low voltage capability for use in ultra-low power electronic circuits are either toxic or suffer from unacceptable voltage drift during their lifetime.

New low voltage electrochemical cells capable of maintaining improved voltage consistency during low load conditions are needed.

SUMMARY

The following summary is provided to facilitate an understanding of some of the innovative features unique to the present disclosure and is not intended to be a full description. A full appreciation of the various aspects of the disclosure can be gained by taking the entire specification, claims, drawings, and abstract as a whole.

Provided are low voltage electrochemical cells. A low voltage electrochemical cell includes a metallic anode including an anode metal, a metallic cathode including a cathode metal, the metallic cathode further including a surface layer including an alloy of the anode metal and the cathode metal, an electrolyte disposed between the metallic anode and the metallic cathode, and a separator within the electrolyte or embedded with electrolyte. The electrochemical cell further includes a voltage stabilization electron current between said anode and said cathode, where the voltage stabilization electron current has an amperage capable of maintaining an open load circuit voltage of the electrochemical cell that varies by less than 10 percent over 10 hours or greater, optionally a month or greater, optionally over the cell lifetime, or a non-equilibrium anode metal/cathode metal ratio in the surface layer for 10 hours or greater, optionally a month or greater, optionally over the cell lifetime.

In other aspects, the low voltage electrochemical cell includes a metallic anode, a metallic cathode, an electrolyte disposed between the metallic anode and the metallic cathode, a separator within the electrolyte or embedded with the electrolyte, and a voltage stabilization electron current between said anode and said cathode. The voltage stabilization electron current having an amperage capable of maintaining a terminal voltage of the electrochemical cell that varies by less than 10 percent over 10 hours or greater, or a non-equilibrium anode metal/cathode metal ratio in the surface layer for 10 hours or greater. The voltage stabilization current passes through a resistor external to the cell.

BRIEF DESCRIPTION OF THE DRAWINGS

The aspects set forth in the drawings are illustrative and exemplary in nature and not intended to limit the subject matter defined by the claims. The following detailed description of the illustrative aspects can be understood when read in conjunction with the following drawings, where like structure is indicated with like reference numerals and in which:

DETAILED DESCRIPTION

Figure 1A:
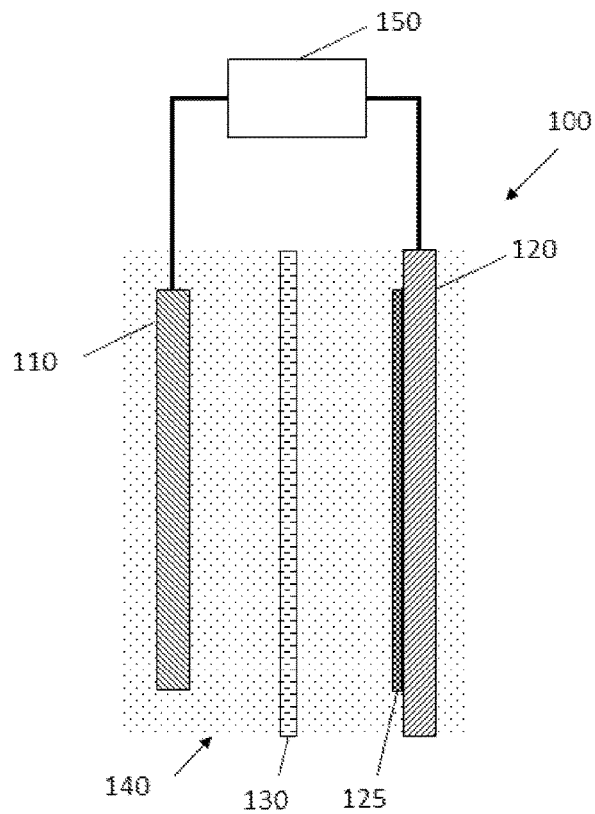
FIG. 1A illustrates a schematic of an exemplary cell according to one or more aspects described herein.

Provided are electrochemical cells that exhibit excellent voltage stability and are suitable for use in low voltage electronic circuits optionally without the need for circuitry or other mechanisms to step down the cell voltage to at or below 1.0 V. The electrochemical cells as provided herein function by utilizing a very low current draw circuit between the anode and the cathode that remains substantially constant during the cell lifetime. This "stabilization current" is independent of any mechanisms of attaching the cells to a desired load during normal operation and is intended to not be opened during any point in the cell lifetime.

Without being bound by any particular theory, it is believed that during discharge electrochemical cell voltage is determined by the difference between the half-cell potential of an anode with an anode metal and the half-cell potential of the alloy product present in a surface layer on the electrolyte facing surface of the metallic cathode, where the alloy is of the anode metal and a cathode metal present in the underlying cathode. Such anode metal alloy products may have several discrete phases of defined composition, generally having progressively lower potential with increasing anode metal content. Therefore, under near-equilibrium discharge conditions, cells having such cathodes will display a series of decreasing voltage plateaus corresponding to the 2-phase coexistence regions associated with given anode metal contents. However, in an active cell, depending on the discharge rate, the alloying and anode metal diffusion kinetics of the different electrochemically accessible alloy phases, the alloy phase and composition present on the surface layer of a cathode may not have the phase and composition expected at equilibrium, but will be a phase and composition with higher anode metal content and lower potential, thus giving lower cell voltage.

Provided herein are low voltage electrochemical cells that capitalize on this understanding of the cathode surface alloy composition and are, therefore, capable of maintaining an open load circuit voltage that varies by less than 5 percent, 10 percent, 15 percent, or 20 percent over 10 hours or greater, 20 hours or greater, 30 hours or greater, 40 hours or greater, 50 hours or greater, 60 hours or greater, 70 hours or greater, 80 hours or greater, 90 hours or greater, 100 hours or greater, or maintain a non-equilibrium anode metal/cathode metal ratio in the surface layer for 10 hours or greater, 20 hours or greater, 30 hours or greater, 40 hours or greater, optionally a month or greater, optionally over the cell lifetime. The cell lifetime may refer to when the initial capacity of a cell decreases by 10% or more, by 20% or more, 30% or more, 40% or more, 50% or more, or any value between 10% and 50%. The lifetime of the cell may further be determined by the open load circuit voltage dropping by more than 5% below nominal, more than 10% below nominal, more than 15% below nominal, more than 20% below nominal.

The low voltage electrochemical cell includes a metallic anode including an anode metal, a metallic cathode including a cathode metal, the metallic cathode further including a surface layer including an alloy of the anode metal and the cathode metal, an electrolyte disposed between the metallic anode and the metallic cathode, and a separator within the electrolyte or embedded with electrolyte. The electrochemical cell utilizes a voltage stabilization electron current between the anode and the cathode, where the voltage stabilization electron current optionally has an amperage capable of maintaining an open load circuit voltage of the electrochemical cell that varies by less than 5 percent, 10 percent, 15 percent, or 20 percent over 10 hours or greater, 20 hours or greater, 30 hours or greater, 40 hours or greater, 50 hours or greater, 60 hours or greater, 70 hours or greater, 80 hours or greater, 90 hours or greater, 100 hours or greater, optionally a month or greater, optionally over the cell lifetime, or optionally a non-equilibrium anode metal/cathode metal ratio in the surface layer for 10 hours or greater, 20 hours or greater, 30 hours or greater, 40 hours or greater, 50 hours or greater, 60 hours or greater, 70 hours or greater, 80 hours or greater, 90 hours or greater, 100 hours or greater, optionally a month or greater, optionally over the cell lifetime. The voltage stabilization electron current between the anode and the cathode may further be capable of maintaining the surface layer composition and optionally thickness for 10 hours or greater, 20 hours or greater, 30 hours or greater, 40 hours or greater, 50 hours or greater, 60 hours or greater, 70 hours or greater, 80 hours or greater, 90 hours or greater, 100 hours or greater, optionally a month or greater, optionally over the cell lifetime.

The voltage stabilization electron current may be provided in a number of ways as described herein illustratively by a low voltage connection between the anode and the cathode external to a cell, within a cell, and/or as provided by a system in which the cell is located.

It should be understood that the term "open load circuit voltage" while not synonymous with the well-understood term "open circuit voltage, (OCV)" the term as used herein has a similar meaning. As used herein "open load circuit voltage" refers to the voltage (i.e., the electrical potential difference) between the anode and cathode terminals of a power supplying device, an electrochemical cell, or battery configured to maintain a current flow (e.g., a stabilization current) between the anode and the cathode when disconnected from an external load. As described in more detail herein, the stabilization current may be generated by placing a high resistance value resistor in parallel with the anode and the cathode of the electrochemical cell. This resistor may be incorporated within the electrochemical cell or coupled to the terminals of the electrochemical cell or battery and optionally the terminals for connecting to an external load that is to be powered.

FIG. 1A is a schematic of an exemplary cell having an anode 110, a cathode 120, a separator 130 and an electrolyte 140 as provided herein with a Li metal anode and an Al cathode where the surface layer 125 on the cathode is an alloy of Li and Al. Under load, for example a load 150, non-equilibrium Li—Al phases (with a Li anode material and Al cathode material as an example) are formed on the surface of the cathode that have lower potential relative the Li anode. If the discharge rate is then reduced, such as in an open circuit state, and the rate of solid-state equilibration of the Li-metal alloy cathode surface phase with the underlying cathode layer or layers exceeds the rate of electrochemical formation of this surface phase, the cell voltage can drift upward toward an equilibrium state, and possibly outside of desired voltage drift tolerance.

In some aspects, a process of stabilizing the voltage of a low voltage electrochemical cell with an open circuit voltage at or less than 1 V includes electrically connecting an anode and a cathode such that a voltage stabilization current flows between the anode and the cathode. The voltage stabilization current may have an amperage capable of maintaining an open load circuit voltage of the electrochemical cell that varies by less than 5 percent over 10 hours or greater, a terminal voltage of the electrochemical cell that varies by less than 10 percent over 10 hours or greater, or a non-equilibrium anode metal/cathode metal ratio in the surface layer for 10 hours or greater.

In the case of the lithium anode/aluminum cathode cell, the open circuit voltage is determined by the thermodynamic phase or mixture of LiAl phases present on the surface layer 125 of the aluminum cathode. Table 2 illustrates the identity and voltages of the phases vs Li as determined by Rao et al, (B. M. I. Rao, R. W. Francis, and H. A. Christopher, Lithium-Aluminum Electrode, J. Electrochem. Soc. 1977 volume 124, issue 10, 1490-1492.).

TABLE 2

EMF of Lithium-Aluminum Phases

| Surface Layer Phase Composition | Lithium Content (mole %) | Voltage vs. Li metal |
|---|---|---|
| alpha LiAl + beta LiAl* | 15-46 | 0.37-0.4 |
| LiAl (beta LiAl) | 46-56 | 0.365-0.37 |
| LiAl + $Li_3Al_2$ | 56-60 | 0.35-0.365 |
| $Li_3Al_2$ + $Li_9Al_4$ | 60-67 | 0.275-0.35 |
| Li + $Li_9Al_4$ | >67 | <0.275 |
| Li | 100 | 0 |

*Where alpha LiAl = solid solution of Li in Al and beta LiAl = LiAl

For example, the phase that determines the operating voltage vs. Li of 0.275-0.35 V contains 60-67 mole % Li and comprises a mixture of $Li_3Al_2$ and $Li_9Al_4$. If this mixed phase is present on the surface of the cathode during discharge, it will peg the cell voltage at 0.275-0.35 V (minus any ohmic drop associated with electrolyte and surface resistance, which may be negligible). If the cell current is sufficiently low, however, Li will gradually move away from the highly lithiated cathode surface by diffusing through the Li—Al region into the underlying Al to form additional Li—Al until a two-phase equilibrium is reached with the lower Li content layers beneath the surface of the cathode. As a result, the cell voltage will begin to rise as lower Li content mixed phases, such as the LiAl+$Li_3Al_2$ or the alpha LiAl+beta LiAl mixed phases are formed at the cathode surface, which have higher corresponding potentials vs. Li, being 0.35-0.365 V, and 0.37-0.4 V, respectively.

In aspects of cells as described herein, if the higher anode metal content composition of the surface layer can be maintained by drawing some minimum current from the cell and depositing additional anode metal on the cathode surface at a rate that barely exceeds the rate of anode metal diffusion from the surface layer through the underlying lower anode metal content cathode layers toward cathode metal, then the voltage will be configured to the voltage corresponding to that stabilized higher anode metal content surface layer. This minimum current is defined herein as the voltage stabilization current, which may also referred to herein as stabilization current or voltage stabilization electron current.

The amperage of the voltage stabilization current required depends on several factors. For example, the amperage of the voltage stabilization current may depend on the chemical composition of the cathode surface layer, thickness of the sub-surface lower anode metal content layer, temperature, and relative diffusivity of anode metal (e.g. Li) through the different phases. For example, with a Li anode, an aluminum cathode at room temperature and a surface layer 125 (FIG. 1A) likely is formed of a mixture of $Li_3Al_2$ and $Li_9Al_4$. As such, the voltage stabilization current can, depending on the other characteristics of the cell illustratively be <50 $nA/cm^2$, 50 to 100 $nA/cm^2$, or 50 to 150 $nA/cm^2$, or 100 to 150 $nA/cm^2$, or 100 to 200 $nA/cm^2$, 200 to 250 $nA/cm^2$, or 200 to 300 $nA/cm^2$, 200 to 400 $nA/cm^2$, or 50 to 500 $nA/cm^2$, or 100 to 500 $nA/cm^2$, or 200 to 500 $nA/cm^2$, or 300 to 500 $nA/cm^2$, or 400 to 500 $nA/cm^2$. In some aspects, the voltage stabilization current may be about or less than 10 $nA/cm^2$, about or less than 20 $nA/cm^2$, about or less than 30 $nA/cm^2$, about or less than 40 $nA/cm^2$, about or less than 50 $nA/cm^2$, about or less than 60 $nA/cm^2$, about or less than 70 $nA/cm^2$, about or less than 80 $nA/cm^2$, about or less than 90 $nA/cm^2$, about or less than 100 $nA/cm^2$, about or less than 150 $nA/cm^2$, about or less than 200 $nA/cm^2$, about or less than 250 $nA/cm^2$, about or less than 300 $nA/cm^2$, about or less than 350 $nA/cm^2$, about or less than 400 $nA/cm^2$, about or less than 450 $nA/cm^2$, or about or less than 500 $nA/cm^2$.

Since the rate of anode metal diffusion can increase or decrease with different surface phases and/or temperature, the voltage stabilization current can be increased or decreased to compensate. In addition to anode metal diffusion from the surface layer into the underlying cathode, anode metal can also be removed from the surface layer by side reactions with the electrolyte. In this instance, the voltage stabilization current may be increased to compensate for this additional anode metal removal mechanism from the surface layer.

Figure 1B:
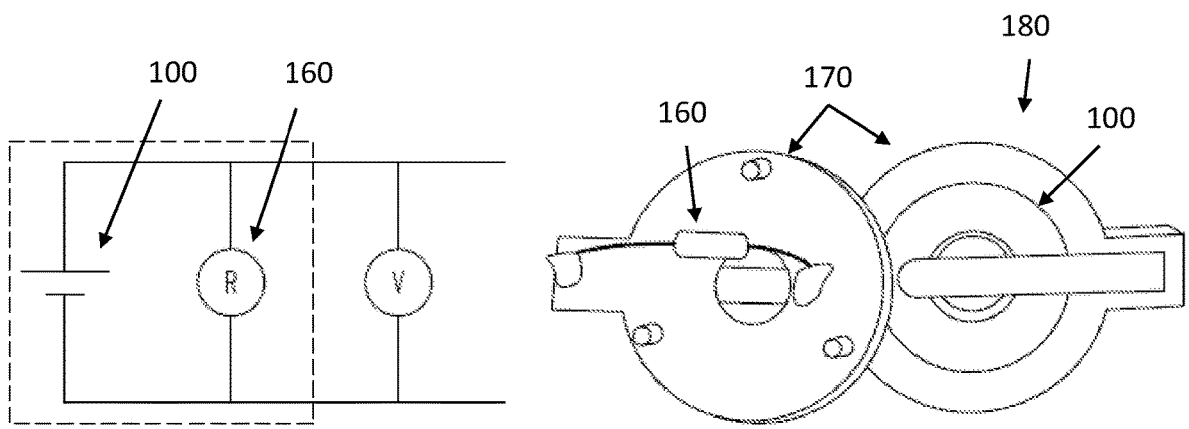
FIG. 1B illustrates a circuit schematic and illustrative implementation of the voltage stabilized low-voltage electrochemical cell according to one or more aspects described herein.

The voltage stabilization current can, in some aspects, be applied to the cell when it is not in operation (e.g. open load circuit) by storing the cell in a cell holder that forms a path for electron transport from an anode to a cathode where the path is equipped with a load such as a resistor 160. Referring to FIG. 1B, a resistor 160 may be attached to the anode and cathode pins on the cell holder 170 and may be sized to draw the required voltage stabilization current. The open load circuit voltage is the voltage value measured as indicated by voltmeter "V" in FIG. 1B. It is understood that resistor 160 is not an external load, but rather a load configured to generate the predefined voltage stabilization electron current.

In an exemplary aspect, an electrochemical cell 100 may be a coin cell, the resistor 160 can be directly connected across the insulator gap separating the anode and cathode. In other aspects, the resistor 160 can be the thru-hole type or surface mount type. For example, in a CR2025 Li/Al cell with a cathode surface area of 2 $cm^2$ that operates at 0.33 V at room temperature, a 1.5 Million Ω resistor is required to maintain 200 nA stabilization current, as can be determined from Ohm's Law. The resistor 160 can be a thru-hole or surface mount design and can alternatively be directly connected across the insulator gap separating the anode and cathode in a coin cell (e.g., the electrochemical cell 100). It should be understood that the coin cell as the electrochemical cell 100 is merely an example.

When the electrochemical cell 100 is in a device, the operation of the device usually provides more than the minimum voltage stabilization current. The voltage stabilization current can still be easily applied if the device is turned off or if the current draw is insufficient by switching the cell electronically or mechanically into a resistor circuit (e.g. as shown in FIG. 1B) that can apply the voltage stabilization current. If the cell 100 has the voltage stabilization resistor 160 already attached, for example, a coin cell with a surface mount resistor 160 connected across the insulator gap, then the device does not need any special electronic modification to apply the voltage stabilization current. In such a case, current draw through the resistor 160 will occur in parallel with the electronic circuit for which the battery is used.

Yet another method for applying the voltage stabilization current is to have the resistor internal to the cell. In this instance, the resistor electrically connects the anode to the cathode across the separator. This can, in some aspects, be in the form of an opening in the separator to allow the connection. The internal resistor can be in the form of a surface mount or thin film resistor.

Yet another method for applying the voltage stabilization current is to use an electrically conductive separator. That is, a soft short in the cell may provide the voltage stabilization electron current through the separator. A "soft" short is a leak of electrical current through something that is partially conductive such as the separator material, rather than a "hard" short such as what occurs when one conductor contacts another. This can be achieved by fabricating a porous membrane using an electrically conductive powder-filled base polymer. The electrically conductive base polymer can comprise a plastic filled with an electrically conductive powder such as carbon, copper, nickel or silver, or a combination thereof. For a carbon filled polymer, the polymer can include a thermoplastic polymer such as polyolefin, polyvinylidene fluoride, and polyester. The carbon can comprise acetylene black, graphite, carbon nanotubes, graphitic nanofibers, graphene and mixtures thereof. Another method for forming an electrically conductive separator is to fabricate a porous separator using a base polymer comprising an intrinsically electrically conductive polymer such as polypyrrole or polyaniline, or a combination thereof.

The soft short in the cell may provide a voltage stabilization electron current through the separator having a value of about 5 nA, 10 nA, 20 nA, 30 nA, 40 nA, 50 nA, 60 nA, 70 nA, 80 nA, 90 nA, 100 nA, 110 nA, 120 nA, 130 nA, 140 nA, 150 nA, 160 nA, 170 nA, 180 nA, 190 nA, 200 nA, 250 nA, 300 nA, 350 nA, 400 nA, 450 nA, 500 nA, or any value therebetween 5 nA and 500 nA.

Yet another method for forming an electrically conductive separator is to post treat a non-electrically conductive membrane with an electrically conductive coating such as polypyrrole, polyaniline, or Poly(3,4-ethylenedioxythiophene). Yet another method for forming an electrically conductive separator is to fabricate a membrane composed of inorganic semiconductor that is electrochemically stable to anode metal, optionally Li, contact.

The electrical resistance of separator should be sufficient to draw the required stabilization current. For example, in a CR2025 Li/Al cell with a cathode surface area of 2 $cm^2$ that operates at 0.33 V at room temperature, the electrical resistance of the separator should be 1.5 Million Ω to maintain a 200 nA stabilization current, as determined from Ohm's Law. For other configurations, the value of the voltage stabilization current is readily determined by one of skill in the are in light of this disclosure.

It is should be understood that the stabilization current concept can be employed in other battery systems using different metal anodes/cathode combinations such as lithium/tin, lithium/lead, lithium/indium, lithium/gallium, lithium/antimony, magnesium/aluminum, magnesium/lead, calcium/indium and calcium/lead. More generally, metal anodes may include a metal such as lithium, barium, strontium, magnesium, calcium, or combinations thereof. Similarly, metal cathodes may include a metal such as aluminum, tin, lead, indium, gallium, thallium, antimony, iron, silicon, copper, manganese, magnesium, zinc, germanium, selenium, bismuth, cadmium, silver, mercury, or combinations thereof.

The aluminum foil cathode of the exemplary aspects as provided herein can include aluminum or an alloy of aluminum with iron, silicon, copper, manganese, magnesium, zinc, tin and other elements as well as combinations of these elements. The purity of the aluminum can be greater than 90%, optionally greater than 99%. The aluminum can be mechanically tempered, thermally tempered, thermally annealed or a combination of these treatments. The Aluminum Association Inc. has developed an identification/designation system that specifies and describes the alloy content, type of alloy, the tempering and/or annealing properties and whether the alloy can be heat treatable (where the alloy can gain strength by heating and aging) or not heat treatable. The aluminum foil of the cathode used in some aspects as provided herein may be or include 1100 series of aluminum. In the 1100 series, the aluminum purity is greater than 99% and various tempers and annealed sub categories exist. For example, 1100-H18 is a hardened, mechanically tempered 99% purity aluminum, while 1100-0 is annealed. In some instances, a mechanically tempered aluminum may be used rather than an annealed aluminum. For example, when the cell temperature shifts, a mechanically tempered aluminum can achieve a new stable voltage with less voltage swing than an annealed aluminum.

The thickness of the aluminum foil cathode can be determined by the size and type of electrochemical cell. In some aspects, it may be desirable to use an amount of cathode that, along with the anode will maximize cell capacity. The maximum aluminum or aluminum alloy cathode and lithium anode thickness can be calculated as follows:

Max Al thickness in mm=$0.457 \times (t-0.6)$

Max Li thickness in mm=$0.543 \times (t-0.6)$ where t=nominal cell thickness (e.g., 2.5 mm for 2025), and the 0.6 factor is derived from the assumption of 2×0.25 mm can wall thickness plus another 0.1 mm (100 um) for separator and other component thickness.

For example, in a 2025 button cell the thickness of the aluminum cathode can be less than 1 mm, or less than 0.5 mm.

Aluminum and aluminum alloys have a passivating native oxide film that can have a very high impedance and prevent cell discharge. In this case, the native oxide can be removed prior to cell assembly by abrasion such as with a 2000 grit sandpaper under inert atmosphere to prevent re-oxidation prior to cell assembly.

Another method of removing the native oxide film on aluminum foil is to coat the foil with an abrasive powder combined with a polymer binder followed by calendering in air or under inert atmosphere. The calendering action grinds the abrasive powder over the metal surface and abrades the native oxide layer, exposing fresh metal. The calendering pressure should be sufficient to sufficiently abrade the surface oxide coating of the aluminum foil. The presence of the polymer binder then blocks oxygen access and prevents reoxidation of the metal foil surface. Since the abrasive powder coating becomes part of the cell cathode, in some aspects the abrasive powder is electrochemically inert to lithium reduction. Illustrative abrasive powders that may be used include boron (optionally submicron boron), iron, and tungsten carbide. The polymer binder may be electrochemically inert in contact with the cathode powder and not be dissolved by cell electrolyte. Suitable binders include but are not limited to polyvinylidene fluoride, polybutadiene-styrene, polyisobutylene, polyisoprene, ethylene-propylene diene and polyacrylic acid. The amount of abrasive powder relative to polymer binder may be 70-90% by weight. In addition to a first abrasive powder, a second non-abrasive powder such as acetylene black, graphite, or graphene can be added. An abrasive powder is optionally present as a predominate, optionally 50% or more by weight, optionally 60% or more by weight, optionally 79% or more by weight, optionally 80% or more by weight where the percent by weight is relative to the abrasive powder, polymer binder, and secondary non-abrasive powder. A non-abrasive powder is optionally present at 1 to 10% by weight, optionally 2 to 10% by weight. A polymer binder is optionally present at 1 to 10% by weight, optionally 2 to 10% by weight. In some aspects, the ratio of abrasive to non-abrasive powder to binder can be 80:10:10 by weight.

In the case of a cathode powder composite, the cathode can be composed of the cathode active element powder and a binder, optionally a polymer binder, coated onto a conductive substrate (e.g., copper foil) with or without a conductive additive (e.g., acetylene black, graphite or graphene). When a powder active is used, the active may be formed into a slurry. The cathode coating slurry can be prepared by dissolving a binder in a solvent optionally followed by dispersing the cathode active powder and optionally a conductive additive. The slurry can be cast onto a conductive substrate such as copper foil, dried, and calendered.

Calendering can be required for some metal powders such as aluminum to fracture the passivating high impedance native oxide surface and allow cell discharge. Calendering can be performed under inert atmosphere or in air. The calendering pressure should be sufficient to substantially abrade or crack the surface oxide coating of the aluminum powder. In the case of air calendering, the presence of the cathode binder can block oxygen and prevent reoxidation of the fresh aluminum surface. The polymer binder should be substantially chemically stable in contact with the active cathode powder and should not be dissolved by cell electrolyte.

Illustrative binders include but are not limited to polyvinylidene fluoride, polybutadiene-styrene, polyisobutylene, polyisoprene, ethylene-propylene diene, and polyacrylic acid. Suitable conductive additives include, but are not limited to acetylene black, graphite, and graphene.

Yet another method for removing the native oxide from the surface of aluminum foil or powder composite is electrochemical etching or electrochemical activation. This method does not require mechanical abrasion and can be performed in-situ which may be more practical than abrasion.

For oxide removal using electrochemical etching or electrochemical activation, following cell assembly the cell is initially charged to a voltage higher than 0.5 V, or optionally higher than 1.0 V, or optionally higher than 1.5 V depending on the electrolyte. While not wanting to be bound by any particular theory, the electrically insulative aluminum oxide surface may be dissolved in a suitable electrolyte salt. Suitable electrolyte salts include lithium tetrafluoroborate ($LiBF_4$), lithium bis(trifluoromethanesulfonyl)imide (LiTFSi), lithium bis(fluorosulfonyl)imide (LiFSi), and lithium trifluoromethanesulfonate (LiTFS). For example, when the electrolyte is comprised of LiTFS salt, the cell can be initially charged to around 3 V or more to electrochemically activate the aluminum. In the case of LiTFSi and LiFSi the cell can be initially charged to 4 V or more to activate the aluminum. In the case of $LiBF_4$ the cell can be initially charged to more than 4.5 V to activate the aluminum. Suitable electrolyte solvents include organic carbonates such as propylene carbonate, ethylene carbonate, diethyl carbonate, dimethyl carbonate, ethyl methyl carbonate, and organic ethers such as tetrahydrofuran and dimethoxyethane and lactones such as butyrolactone and mixtures thereof.

Various aspects are illustrated by the following non-limiting examples. The examples are for illustrative purposes and are not a limitation on any practice of the present invention. It will be understood that variations and modifications can be made without departing from the spirit and scope of the invention.

EXAMPLES

Example 1

Figure 2:
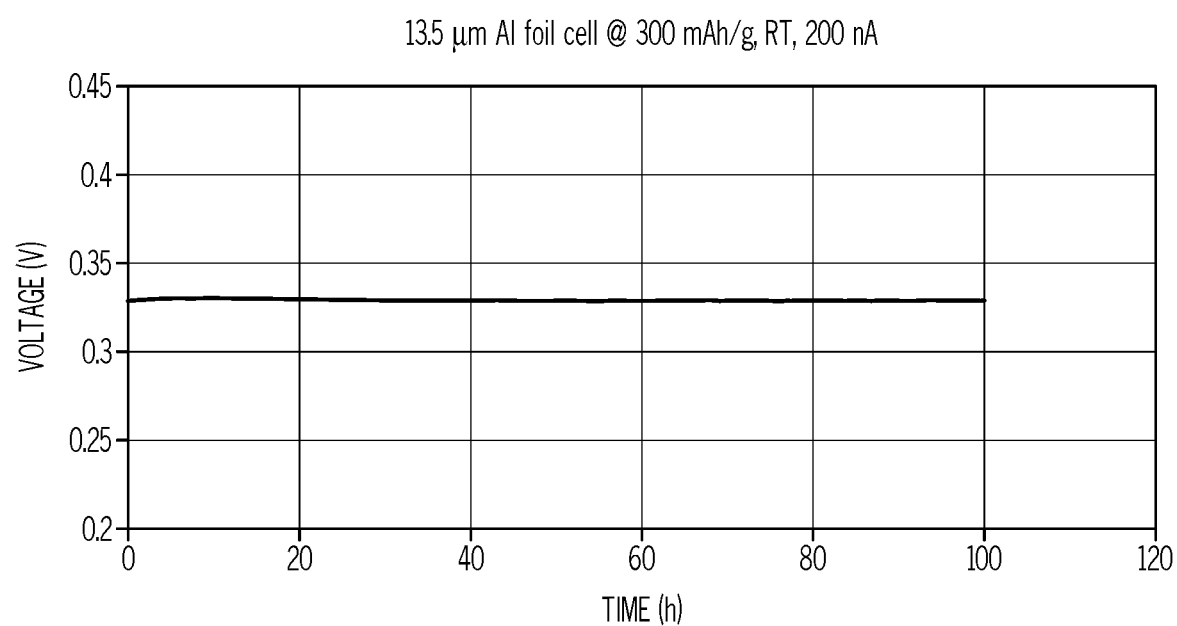
FIG. 2 illustrates a voltage plot of an exemplary cell showing voltage stability under a continuous load according to one or more aspects described herein.

A CR2025 cell is constructed with 1M LiTFSi EC/EMC 1/1 electrolyte, 2 layers of CG2500 separator, 5/8" diameter 13.5 μm thick Al (1100-H18) cathode and a 127 μm thick 21/32" diameter Li foil anode. The cell is activated by charging at 1 μA for 1 hour, followed by pre-discharging for 20 hours at 100 μA to remove the surface oxide layer on the cathode and bring the cell well into a stable voltage region for testing. FIG. 2 illustrates the discharge voltage profile of the cell previously discharged to ~300 mAh/g (~2.2 mAh) at a 200 nA continuous drain at room temperature. As shown in FIG. 2, the cell voltage remains stable at 0.33 V under the continuous low load for over 100 hours.

Example 2

Figure 3:
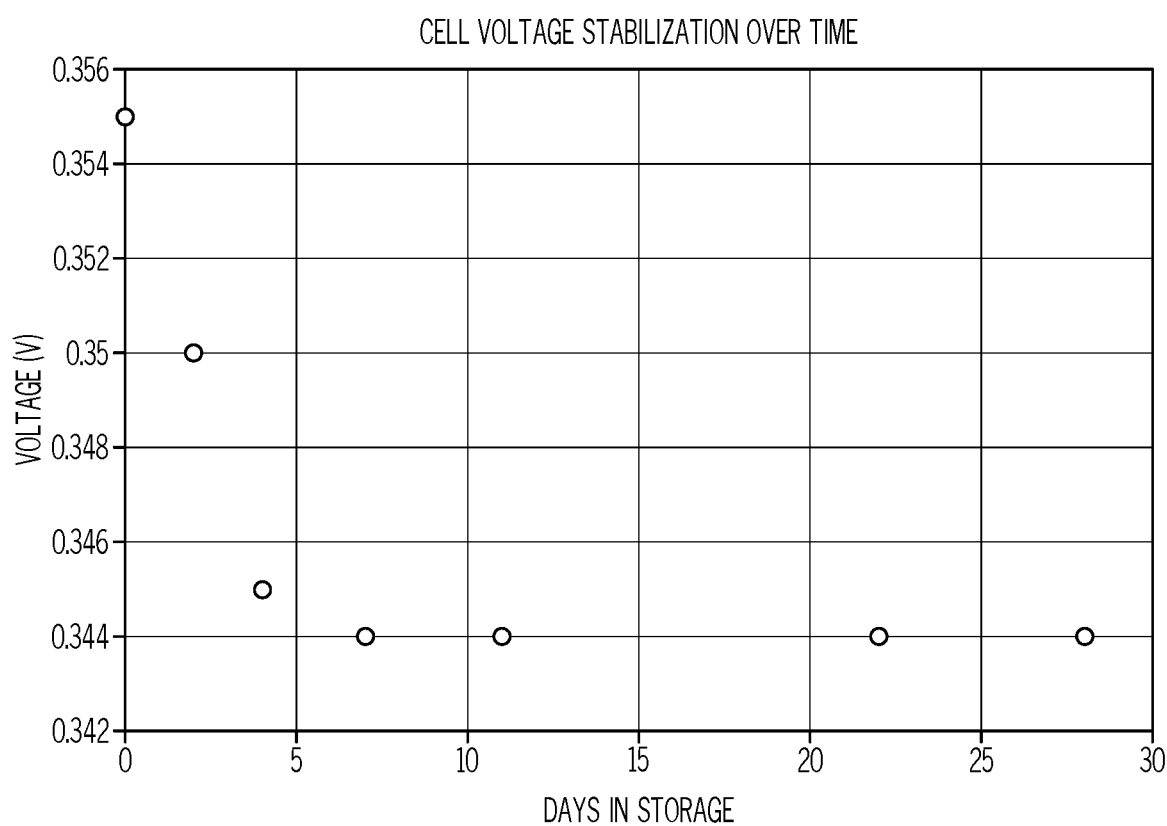
FIG. 3 illustrates a voltage plot of an exemplary cell showing voltage stabilization over time according to one or more aspects described herein.

In the present example, three CR2025 cells are constructed with 1M LiTFSi EC/EMC 1/1 electrolyte, 2 layers of CG2500 separator, 5/8" diameter 300 μm thick Al (1100-H18) cathode and four layers of 127 μm thick 21/32" diameter Li foil anode. The cells are activated by charging at 1 μA for 2 hours, followed by pre-discharging to 62 mAh/g to remove the surface oxide layer on the cathode and bring the cells well into a stable voltage region for testing. The cells are then placed into cell holders affixed with 1.5 MΩ resistors, for example, as depicted in FIG. 1B, to provide the ~200 nA quiescent current required for voltage stabilization. Voltage measurements are made over four weeks of room temperature storage to ensure that the cells stabilize at the expected load voltage. FIG. 3 illustrates that the cells reach a stable voltage of 0.344 V in 4-7 days under an approximately 230 nA current draw delivered by the 1.5 MΩ resistors as expected.

Example 3

Figure 4A:
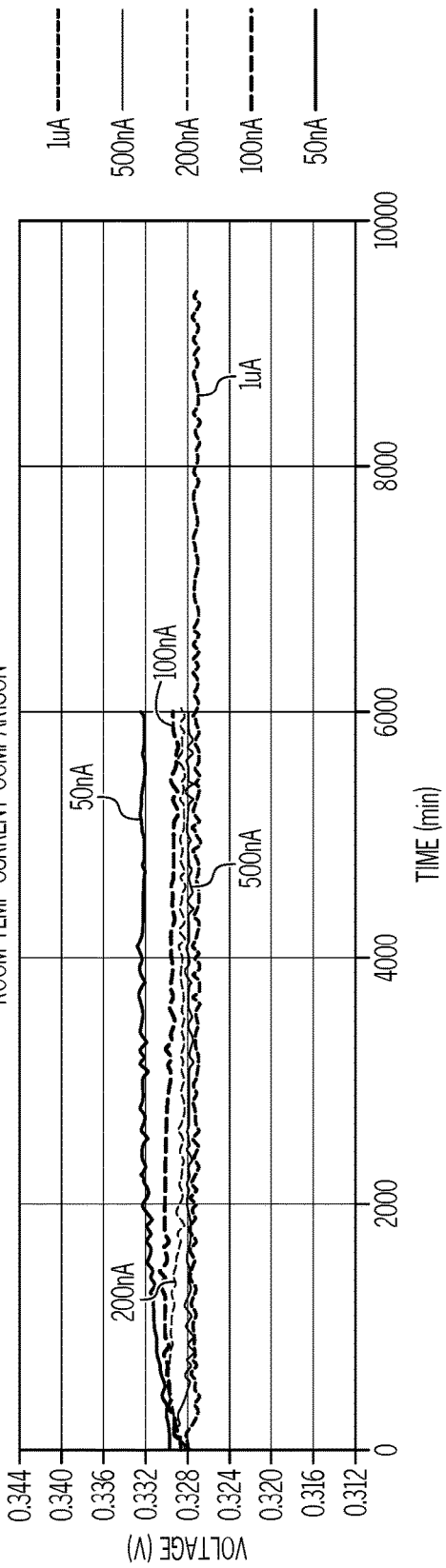
FIG. 4A illustrates a voltage plot of exemplary cells discharged at various discharge rates at room temperature according to one or more aspects described herein.
Figure 4B:
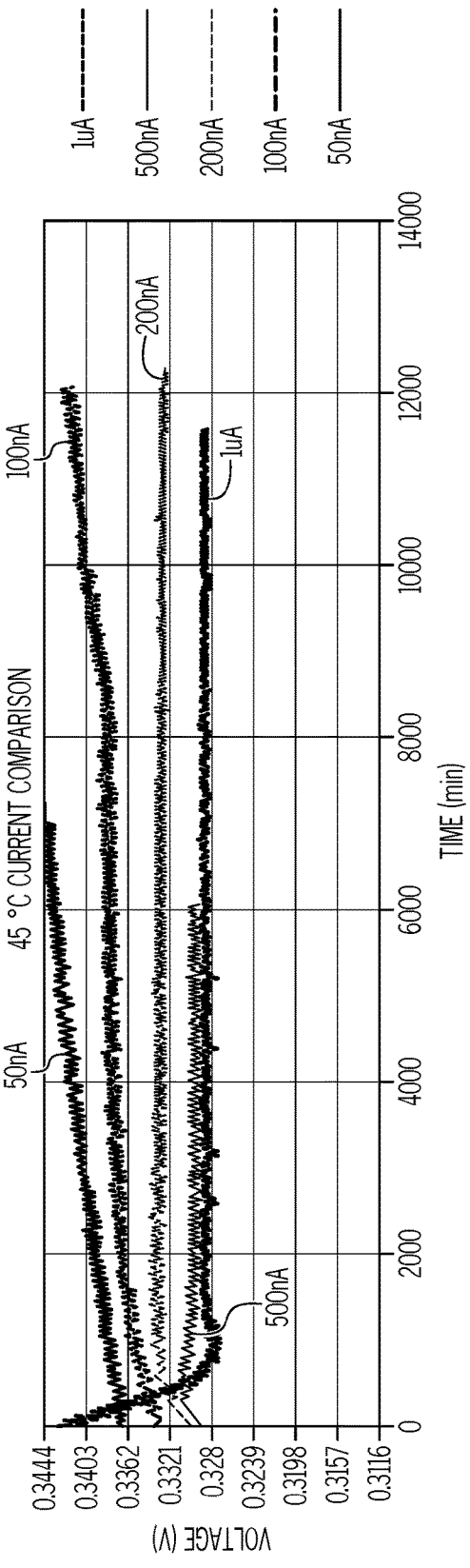
FIG. 4B illustrates a voltage plot of exemplary cells discharged at various discharge rates at 45 degree C. according to one or more aspects described herein.

A CR2025 cell is constructed with 1M LiTFSi EC/EMC 1/1 electrolyte, 2 layers of CG2500 separator, 5/8" diameter 13.5 μm thick Al (1100-H18) cathode and a 127 μm thick 21/32" diameter Li foil anode. The cell is activated by charging at 1 μA for 2 hours, followed by pre-discharging for 20 hours at 100 μA to remove the surface oxide layer on the cathode and bring the cell well into a stable voltage region for testing. The cell has been discharged to ~300 mAh/g (~2.2 mAh) before being tested under various loads at different temperatures. At room temperature the cell voltage remains reasonably stable under all loads tested between 50 nA-1 μA as shown in FIG. 4A. However, the cell voltage begins to increase sharply as the applied current drops below 200 nA when the cell is at 45° C. as shown in FIG. 4B. However, it is observed that a 200 nA quiescent current delivers a stable voltage at elevated temperature.

Example 4

Figure 5:
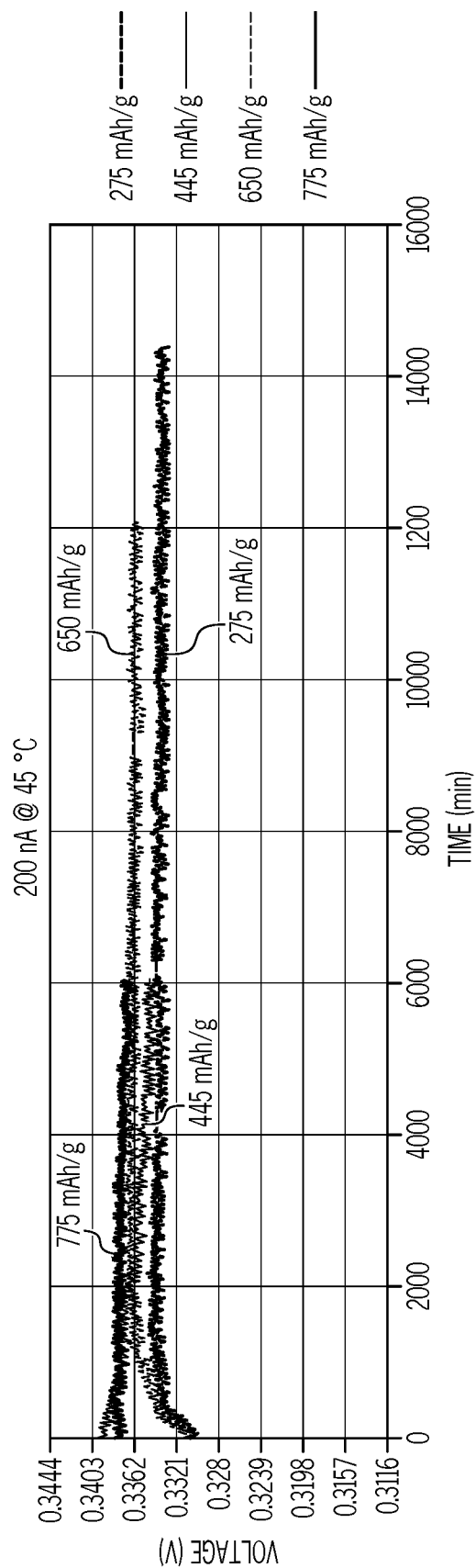
FIG. 5 illustrates a voltage plot over time of exemplary cells discharged to various depths of discharge and stored at 45 degree C. according to one or more aspects described herein.

A CR2025 cell is constructed with 1M LiTFSi EC/EMC 1/1 electrolyte, 2 layers of CG2500 separator, 5/8" diameter 13.5 μm thick Al (1100-H18) cathode and a 127 μm thick 21/32" diameter Li foil anode. The cell is activated by charging at 1 μA for 2 hours, followed by pre-discharging for 20 hours at 100 μA to remove the surface oxide layer on the cathode and bring the cell well into a stable voltage region for testing. The cell was then tested at 200 nA and 45° C. at multiple depths of discharge across the life of the cell. As depicted in FIG. 5, it can be observed that the voltage remains stable under these conditions across the full depth of discharge of the cell indicating that the 200 nA quiescent current is sufficient to stabilize the voltage throughout the life of the cell.

Example 5

Figure 6:
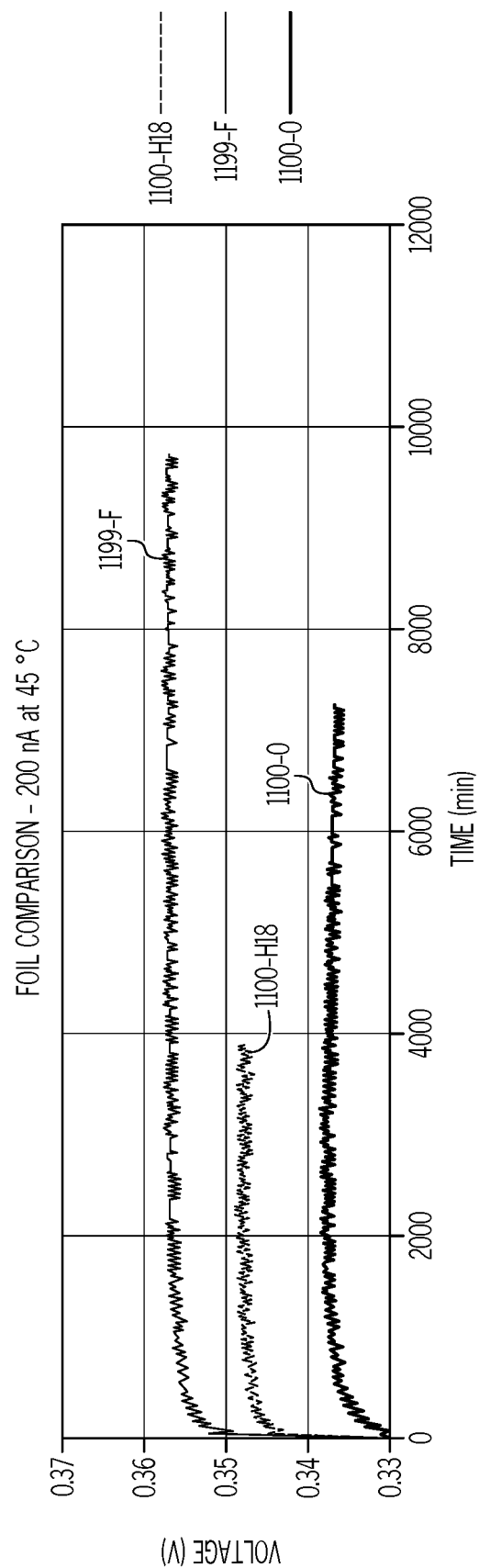
FIG. 6 illustrates a voltage plot of experimental cells made with different types of Al foil cathodes according to one or more embodiments described herein.

A CR2025 cells are constructed with 1M LiTFSi EC/DEC 1/1 electrolyte, 2 layers of CG2500 separator, four layers of 127 μm thick 21/32" diameter Li foil anode and a 5/8" diameter cathode made from either 250 μm annealed (1100-0), 300 μm full-temper (1100-H18) or 320 μm pure, as rolled (1199-F) Al foil. The cells were activated by charging at 1 μA for 2 hours, followed by pre-discharging at an elevated current (100 to 400 μA) to remove the surface oxide layer on the cathode and bring the cell well into a stable voltage region for testing. The cells are tested at 200 nA and 45° C. after being discharged to 60-70 mAh/g. The impact of different foils on the voltage under these conditions can be seen in FIG. 6. All cells are able to reach a stable voltage under these conditions, but that voltage varies depending on the Al foil type used. The variations are consistent with voltage variations between the foil types seen at 1 μA and room temperature. In each case, the stabilization voltage under the quiescent current seen for a given foil type in FIG. 6 is within 5% of the load voltage as can be seen in Table 3.

TABLE 3

Load voltages and associated stabilized voltage at high temperature under the quiescent current for thick Al foil CR2025 cells.

| Al Type | Load Voltage (1 μA at RT) [V] | Voltage at 200 nA and 45° C. [V] | Voltage Difference [%] |
|---|---|---|---|
| 1100-O | 0.327 | 0.336 | 2.7% |
| 1199-F | 0.355 | 0.357 | 0.5% |
| 1100-H18 | 0.341 | 0.348 | 2.1% |

Comparative Example 1

Figure 7:
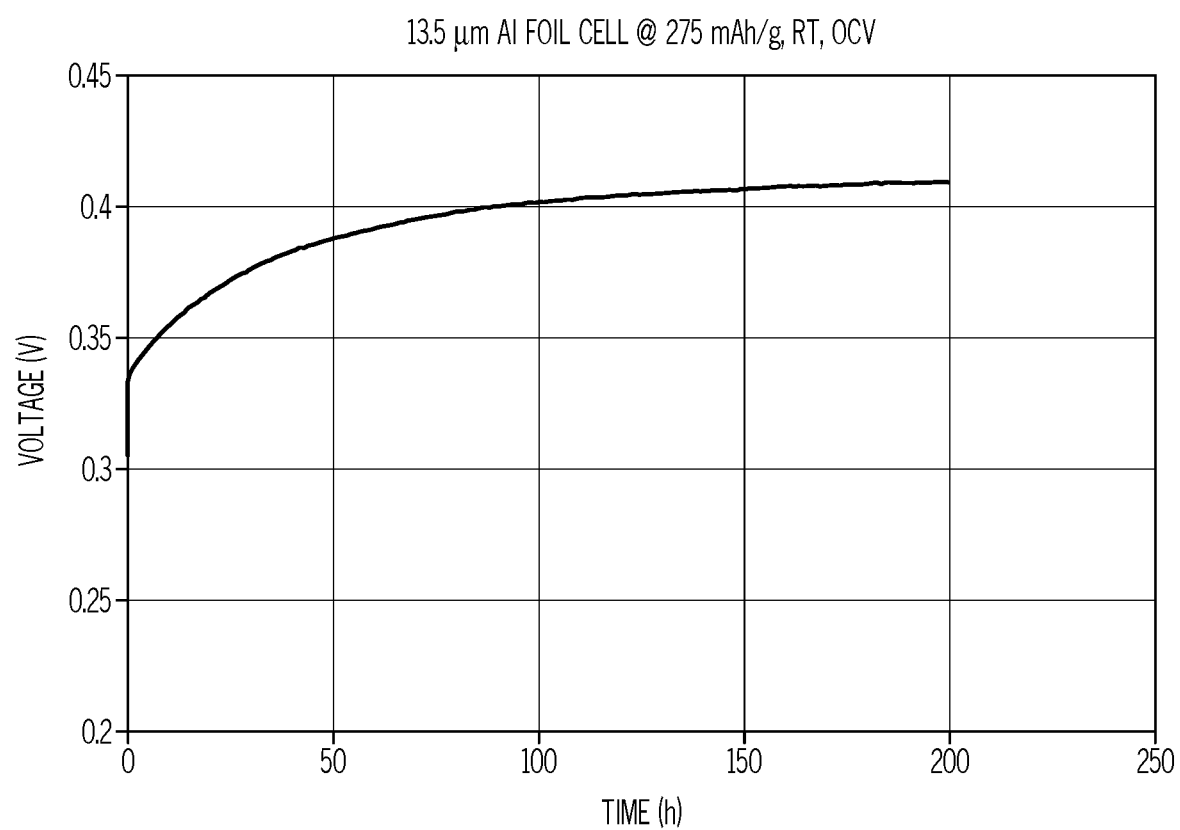
FIG. 7 illustrates a voltage plot of an exemplary cell at room temperature with drain according to one or more aspects as described herein.

A CR2025 cell is constructed with 1M LiTFSi EC/EMC 1/1 electrolyte, 2 layers of CG2500 separator, ⅝" diameter 13.5 μm thick Al cathode and 21/32" diameter Li anode. The cell is activated by charging at 1 μA for 1 hour, followed by pre-discharging for 20 hours at 100 μA to remove the surface oxide layer on the cathode and bring the cell well into a stable voltage region for testing. As shown in FIG. 7, the cell has been discharged to ~275 mAh/g (~2 mAh) and is then placed at OCV at room temperature. The cell voltage is not stable and drifts upward from 0.33 V to 0.4 V over 200 hours as seen in FIG. 7.

Comparative Example 2

Figure 8:
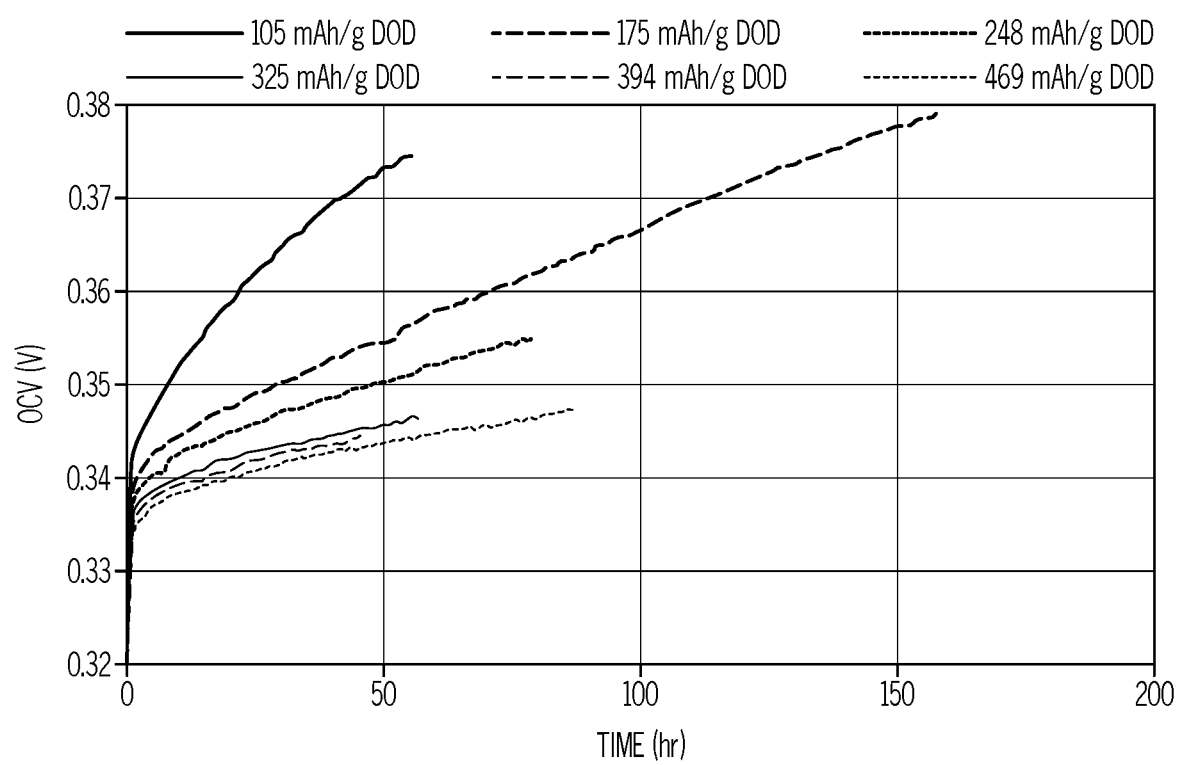
FIG. 8 illustrates a voltage plot of experimental cells discharged to various depths of discharge and the relaxed at OCV according to one or more embodiments described and illustrated herein.

A CR2025 cell is constructed with 1M LiTFSi EC/EMC 1/1 electrolyte, CG2500 separator, ⅝" diameter 13.5 μm thick Al cathode and 21/32" diameter Li anode. The cell is activated by charging at 1 μA for 1 hour, followed by pre-discharging to remove the surface oxide layer on the cathode and bring the cell well into a stable voltage region for testing. The current load is then removed, and the voltage response is recorded over time. This measurement is repeated multiple times at different depths of discharge. Voltage relaxation at OCV following a capacity step-down at 50 μA is shown in FIG. 8. While the rate of voltage increase at OCV declines at deeper depths of discharge, the voltage is never stable within 5% of the load voltage (0.327 V at 1 μA and room temperature) under these conditions. Accordingly, a quiescent current may be necessary to deliver a stable voltage.

Comparative Example 3

Figure 9:
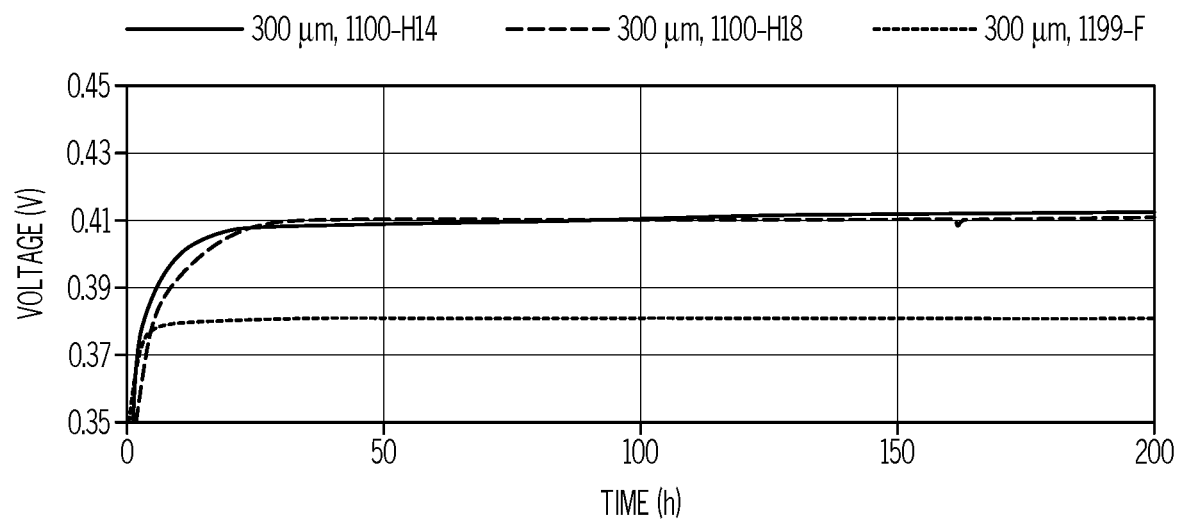
FIG. 9 illustrates a voltage plot of experimental cells made with different types of Al foil cathodes according to one or more embodiments described and illustrated herein.

Multiple CR2025 cells are constructed with 1M LiTFSi EC/DEC 1/1 electrolyte, CG2500 separator, 21/32" diameter Li anode and thick (~300 μm), ⅝" diameter Al cathodes. Each of the cells have a thick Al foil with the following respective types: 1100-H14, 1100-H18, and 1199-F. The cells are activated by charging at 1 μA for 2 hours, followed by pre-discharging to remove the surface oxide layer on the cathodes. The current load is then removed, and the voltage response is recorded over time as shown in FIG. 9. The OCVs for these cells range from 0.38 V to 0.41 V, well above the load voltages which range from 0.32-0.355 V. The pure, as rolled Al foil (1199-F) has the most consistent voltage (0.38 V OCV, 0.355 V load voltage), but OCV is still more than 7% higher than the load voltage. The half-tempered Al foil (1100-H14) has an OCV that is more than 27% higher than its load voltage.

It should now be understood that some aspects described herein are a low voltage electrochemical cell. The low voltage electrochemical cell includes a metallic anode including an anode metal, a metallic cathode including a cathode metal, the metallic cathode further including a surface layer including an alloy of the anode metal and the cathode metal, an electrolyte disposed between the metallic anode and the metallic cathode, and a separator within the electrolyte or embedded with electrolyte. The electrochemical cell further includes a voltage stabilization electron current between said anode and said cathode, where the voltage stabilization electron current has an amperage capable of maintaining an open load circuit voltage of the electrochemical cell that varies by less than 10 percent over 10 hours or greater, optionally a month or greater, optionally over the cell lifetime, or a non-equilibrium anode metal/ cathode metal ratio in the surface layer for 10 hours or greater, optionally a month or greater, optionally over the cell lifetime.

Various modifications, in addition to those shown and described herein, will be apparent to those skilled in the art of the above description. Such modifications are also intended to fall within the scope of the disclosure.

It is appreciated that all reagents are obtainable by sources known in the art unless otherwise specified.

The foregoing description of particular aspect(s) is merely exemplary in nature and is in no way intended to limit the scope of the disclosure, its application, or uses, which may, of course, vary. The materials and processes are described with relation to the non-limiting definitions and terminology included herein. These definitions and terminology are not designed to function as a limitation on the scope or practice of the disclosure, but are presented for illustrative and descriptive purposes only. While the processes or compositions are described as an order of individual steps or using specific materials, it is appreciated that steps or materials may be interchangeable such that the description of the invention may include multiple parts or steps arranged in many ways as is readily appreciated by one of skill in the art.

It will be understood that when an element is referred to as being "on" another element, it can be directly on the other element, or intervening elements may be present therebetween. In contrast, when an element is referred to as being "directly on" another element, there are no intervening elements present.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second (or other) element, component, region, layer, or section without departing from the teachings herein.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

Patents, publications, and applications mentioned in the specification are indicative of the levels of those skilled in the art to which the disclosure pertains. These patents, publications, and applications are incorporated herein by reference to the same extent as if each individual patent, publication, or application was specifically and individually incorporated herein by reference.

What is claimed is:

1. A low voltage electrochemical cell comprising:
    a metallic anode comprising an anode metal;
    a metallic cathode comprising a cathode metal, the metallic cathode further comprising an anode metal/cathode metal phase composition comprising the anode metal and the cathode metal; an electrolyte disposed between the metallic anode and the metallic cathode; and
    a separator within the electrolyte or embedded with electrolyte;
    said low voltage electrochemical cell having an open circuit voltage of 1V or less; wherein the electrochemical cell further comprises a voltage stabilization electron current between said metallic anode and said metallic cathode, wherein said voltage stabilization electron current has an amperage that maintains an open load circuit voltage of the electrochemical cell that varies by less than 10 percent over 10 hours or greater.

2. The electrochemical cell of claim 1, wherein the open load circuit voltage of the electrochemical cell varies by less than 5 percent for 100 hours or greater.

3. The electrochemical cell of claim 1, said voltage stabilization electron current maintains a composition and thickness of anode metal/cathode metal phase composition for 10 hours or greater.

4. The electrochemical cell of claim 1, wherein the electrochemical cell is configured such that the voltage stabilization electron current is provided by a short in the electrochemical cell through the separator.

5. The electrochemical cell of claim 1, wherein the separator comprises an electrically conductive base polymer.

6. The electrochemical cell of claim 5, wherein the electrically conductive base polymer comprises carbon, copper, nickel, silver, or combinations thereof.

7. The electrochemical cell of claim 5, wherein the conductive base polymer comprises polypyrrole, polyaniline, or combinations thereof.

8. The electrochemical cell of claim 1, wherein the electrochemical cell is characterized by a volumetric capacity at or greater than 200 Ah/L.

9. The electrochemical cell of claim 1, wherein the anode metal consists of a metal selected from the group consisting of lithium, magnesium, calcium, or combinations thereof.

10. The electrochemical cell of claim 1, wherein the cathode metal comprises aluminum, tin, lead, indium, gallium, antimony, iron, silicon, copper, manganese, magnesium, zinc, germanium, selenium, bismuth, cadmium, silver, mercury, or combinations thereof.

11. The electrochemical cell of claim 1, wherein the electrochemical cell is configured so that the voltage stabilization electron current flows throughout the lifetime of the electrochemical cell determined by the open load circuit voltage dropping by more than 5% below nominal.

12. The electrochemical cell of claim 1, wherein the voltage stabilization electron current passes through a resistor external to the electrochemical cell.

13. The electrochemical cell of claim 12, wherein the resistor is on a circuit in parallel to a load circuit.

14. The electrochemical cell of claim 12, wherein the resistor is within an external cell holder.

15. The electrochemical cell of claim 12, wherein the resistor is directly connected across an insulator gap between the metallic anode and the metallic cathode.

16. The electrochemical cell of claim 12, wherein the metallic anode comprises Li, the metallic cathode comprises aluminum or an alloy of aluminum and the voltage stabilization electron current is <50 $nA/cm^2$, 50 to 100 $nA/cm^2$, 100 to 200 $nA/cm^2$, or 200 to 400 $nA/cm^2$.

17. The electrochemical cell of claim 1, wherein said anode metal/cathode metal phase composition is maintained in non-equilibrium by said voltage stabilization electron current.

18. A process of stabilizing the voltage of a low voltage electrochemical cell with an open circuit voltage at or less than 1 Volt comprising:
    providing the electrochemical cell comprising:
        a metallic anode comprising an anode metal;
        a metallic cathode comprising a cathode metal, the metallic cathode further comprising an anode metal/cathode metal phase composition comprising the anode metal and the cathode metal; an electrolyte disposed between the metallic anode and the metallic cathode; and
        a separator within the electrolyte or embedded with electrolyte; and
    electrically connecting the anode and the cathode such that a voltage stabilization electron current flows between the anode and the cathode, the voltage stabilization current having an amperage that maintains an open load circuit voltage of the electrochemical cell that varies by less than 5 percent over 10 hours or greater.

19. The process of claim 18, wherein the step of electrically connecting is through a resistor on a circuit absent an operating load.

20. The process of claim 18 further comprising removing a passivating native oxide film on a surface of said cathode prior to said electrically connecting.

21. The process of claim 18, wherein the step of electrically connecting is through a resistor that also serves as a separator between the anode and the cathode of the electrochemical cell.

* * * * *